(12) United States Patent
Kulik et al.

(10) Patent No.: US 8,950,413 B2
(45) Date of Patent: Feb. 10, 2015

(54) APPLICATOR DEVICE, IN PARTICULAR FOR A COSMETICS APPLICATOR, APPLICATOR, IN PARTICULAR COSMETICS APPLICATOR COMPRISING AN APPLICATOR DEVICE, AND AN APPLICATION UNIT, IN PARTICULAR COSMETICS UNIT, COMPRISING THE APPLICATOR DEVICE

(75) Inventors: Daniela Kulik, Leipzig (DE); Christine Pillipp, Nürnberg (DE)

(73) Assignee: GEKA GmbH, Bachhofen (DE)

( * ) Notice: Subject to any disclaimer, the term of this patent is extended or adjusted under 35 U.S.C. 154(b) by 182 days.

(21) Appl. No.: 13/339,849

(22) Filed: Dec. 29, 2011

(65) Prior Publication Data

US 2012/0170965 A1   Jul. 5, 2012

(30) Foreign Application Priority Data

Dec. 30, 2010   (DE) .................... 20 2010 017 160 U

(51) Int. Cl.
*A45D 40/26* (2006.01)
*A46B 9/00* (2006.01)
*A46B 11/00* (2006.01)
*A46B 9/02* (2006.01)

(52) U.S. Cl.
CPC ............. *A46B 9/021* (2013.01); *A45D 40/262* (2013.01); *A45D 40/267* (2013.01); *A46B 2200/1053* (2013.01); *Y10S 132/901* (2013.01)
USPC ............................ 132/218; 132/901; 401/129

(58) Field of Classification Search
CPC . A45D 40/262; A45D 40/264; A45D 40/267; A46B 9/021; A46B 2200/1053; A46B 2200/106

USPC ................. 132/216, 218, 901, 313, 317, 320; 401/126, 129; 15/207.2
See application file for complete search history.

(56) References Cited

U.S. PATENT DOCUMENTS

| | | | | |
|---|---|---|---|---|
| 4,561,456 | A * | 12/1985 | Gueret | 132/218 |
| 6,343,607 | B1 * | 2/2002 | Gueret | 132/218 |
| 6,412,496 | B1 * | 7/2002 | Gueret | 132/218 |
| 6,450,177 | B1 * | 9/2002 | Christoforu et al. | 132/218 |
| 6,539,950 | B1 * | 4/2003 | Gueret | 132/218 |
| 6,546,937 | B2 * | 4/2003 | Gueret | 132/218 |
| 6,575,174 | B2 * | 6/2003 | Lee | 132/160 |
| 7,581,898 | B2 * | 9/2009 | Gueret | 401/129 |
| 8,256,437 | B2 * | 9/2012 | Gueret | 132/218 |
| 2003/0213498 | A1 * | 11/2003 | Gueret | 132/218 |
| 2005/0160546 | A1 * | 7/2005 | Weihrauch | 15/207.2 |
| 2009/0133707 | A1 | 5/2009 | Gueret | |
| 2009/0214284 | A1 * | 8/2009 | Gueret | 401/121 |
| 2011/0229246 | A1 * | 9/2011 | Kulik | 401/129 |

FOREIGN PATENT DOCUMENTS

WO   9728719   8/1997

* cited by examiner

*Primary Examiner* — Robyn Doan
*Assistant Examiner* — Tatiana Nobrega
(74) *Attorney, Agent, or Firm* — Setter Roche LLP

(57) ABSTRACT

The invention relates to an applicator device comprising a carrier having an application element covering, which includes a plurality of application elements. At least one application element has, along its longitudinal extent, at least one first section closer to the carrier and at least one second section more distant from the carrier, and at least one section of the application element has a curved central longitudinal axis. Central longitudinal axes or their end tangents of the first and second sections, in a transitional zone from the first to the second section, converge in at least one projection onto a sectional plane through the application element so as to form a bend.

26 Claims, 8 Drawing Sheets

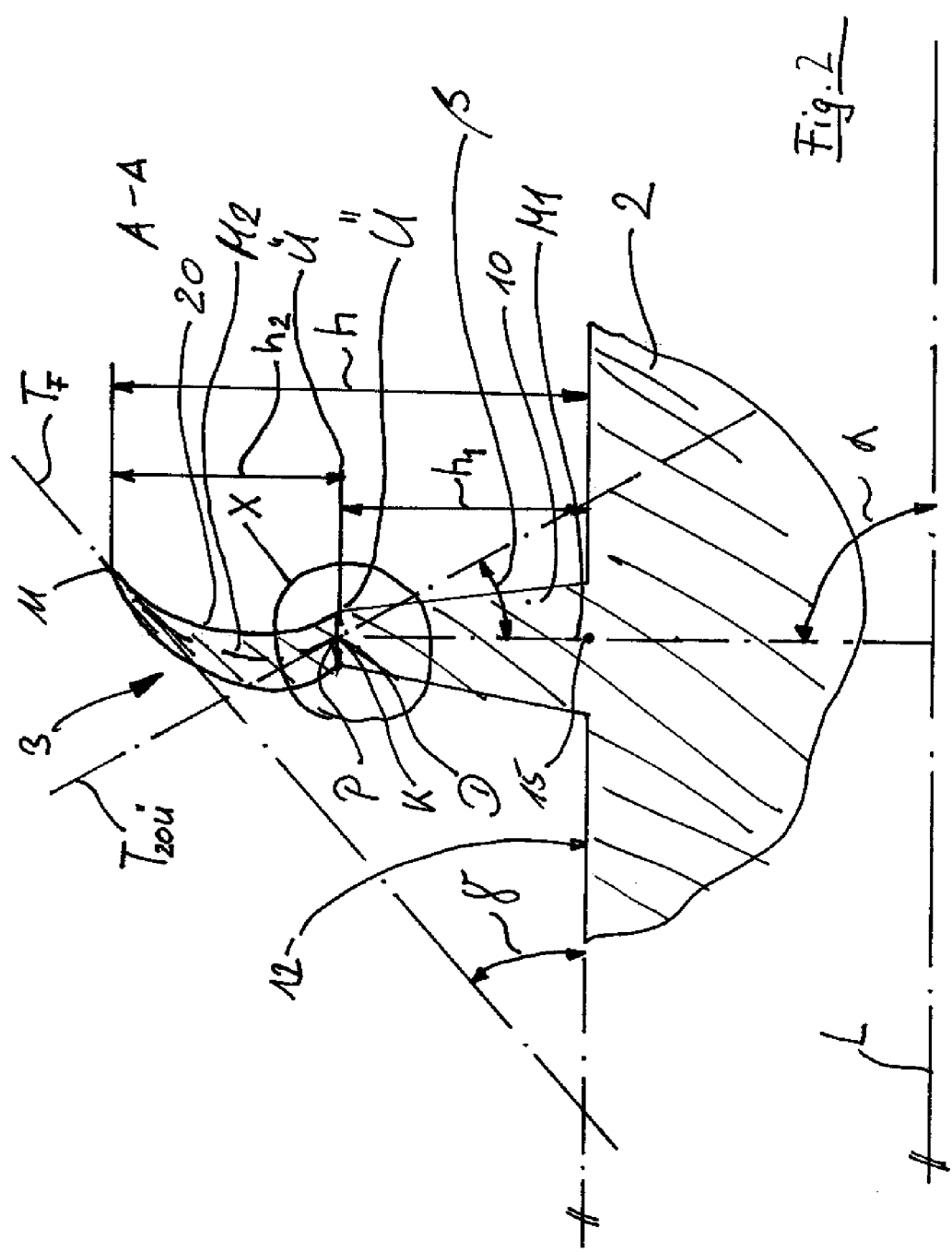

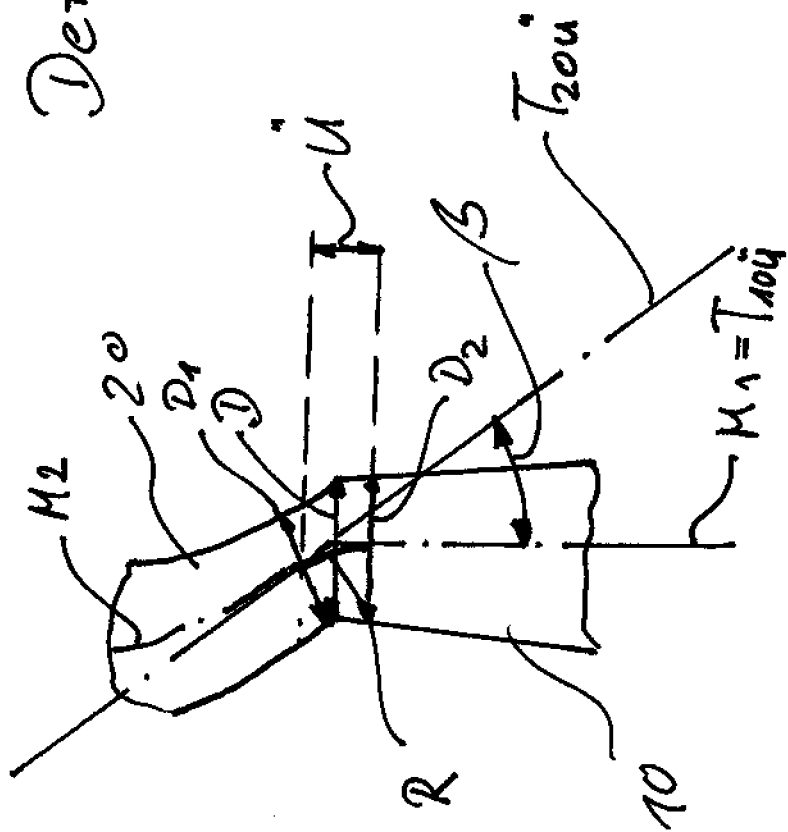

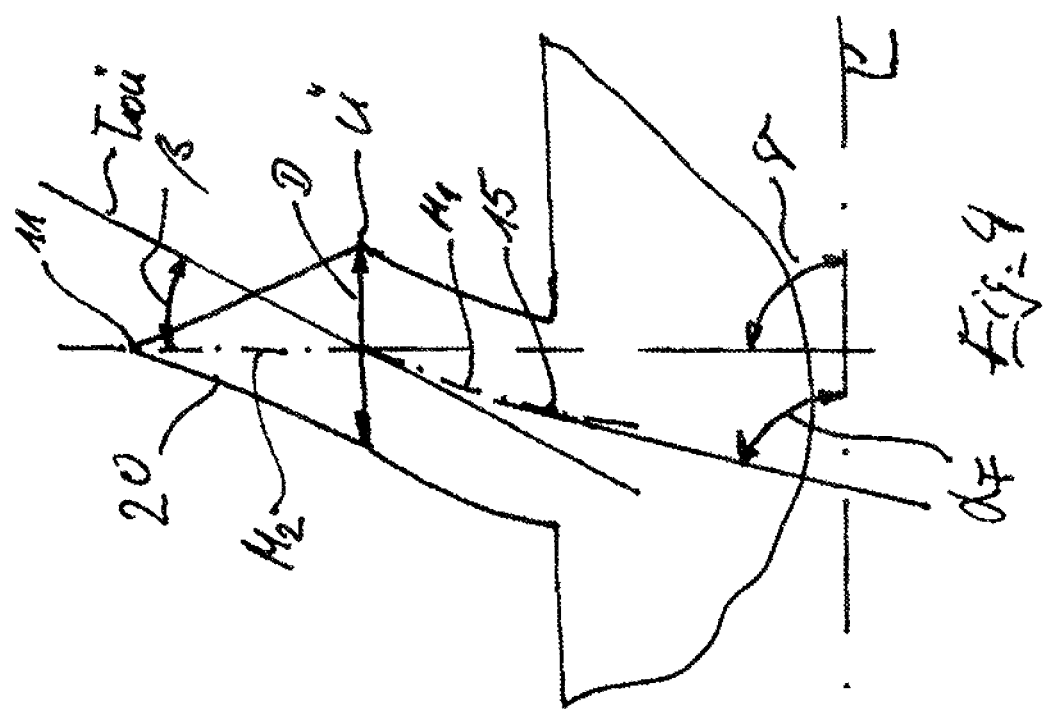

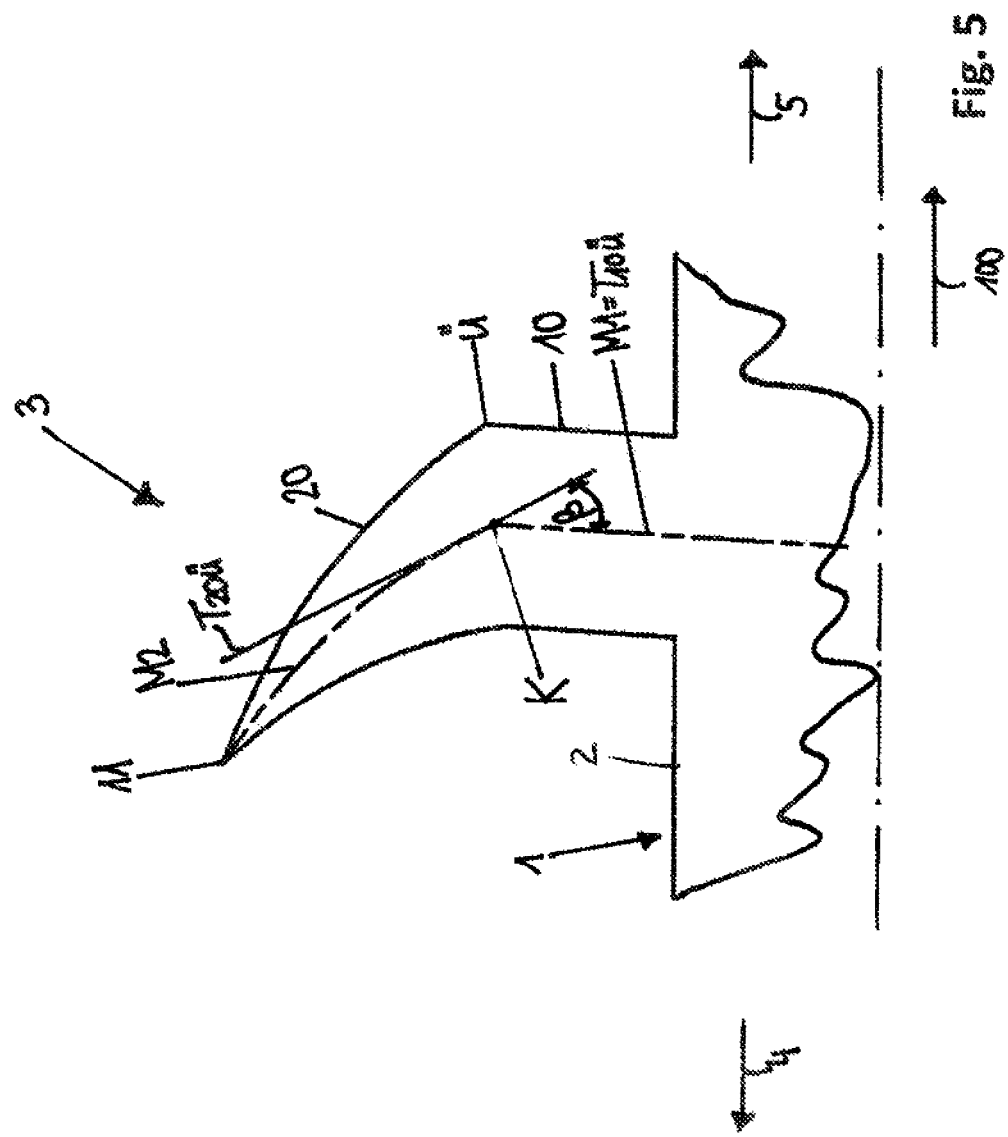

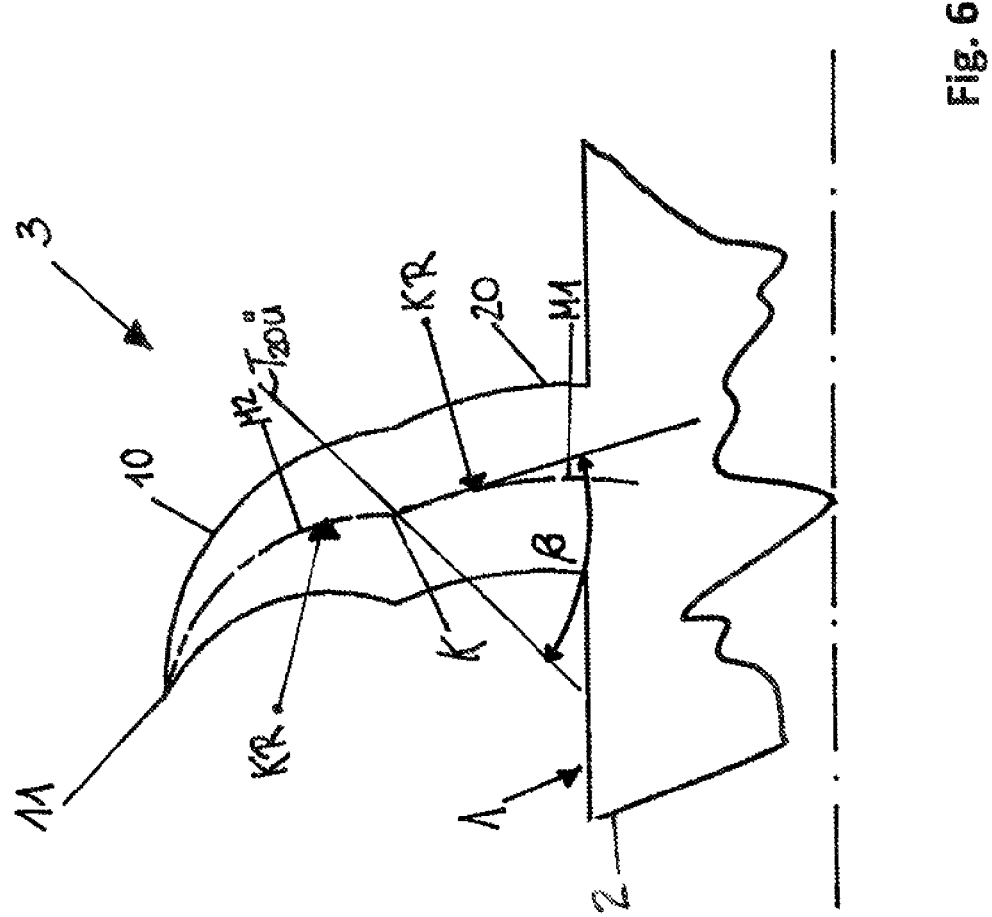

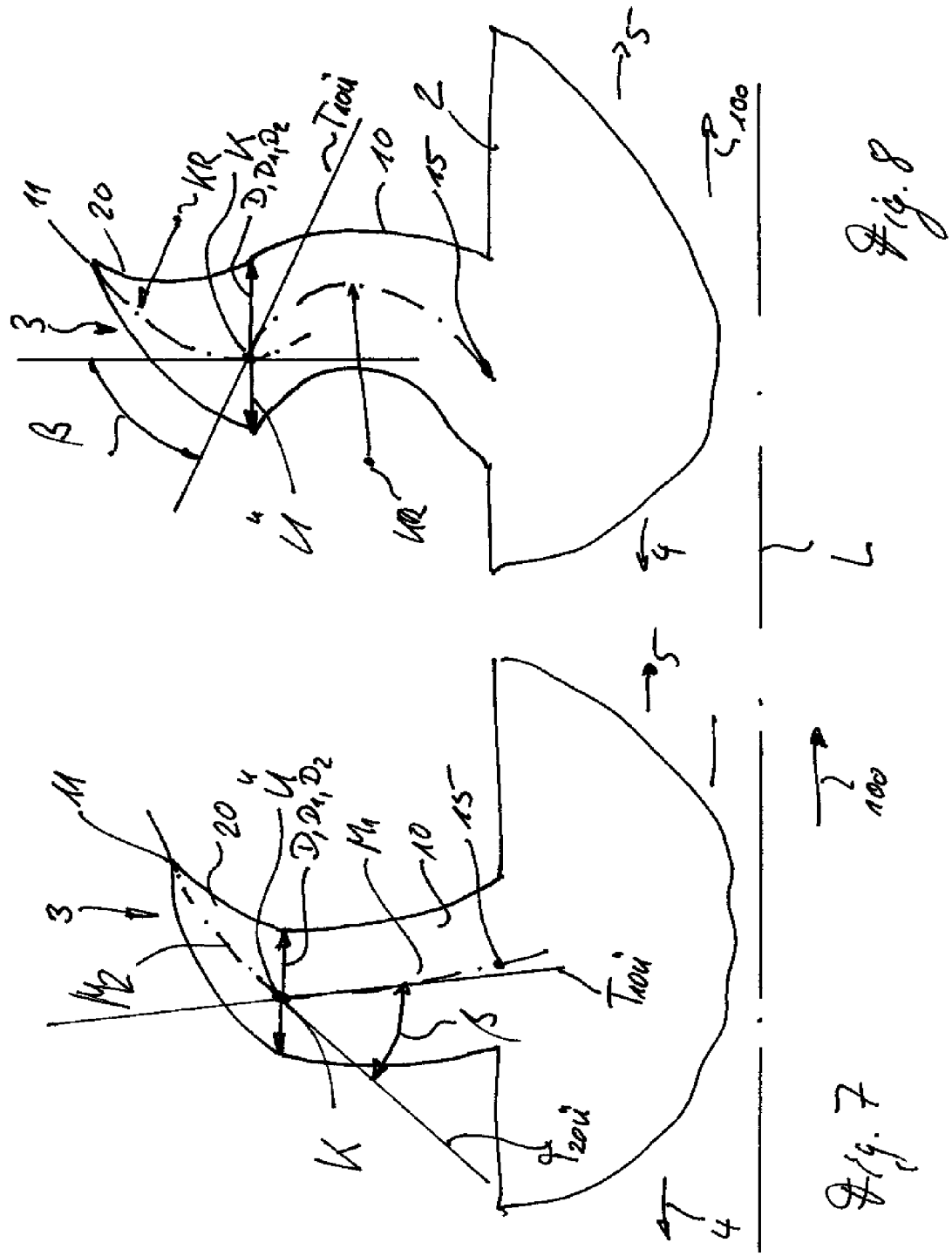

APPLICATOR DEVICE, IN PARTICULAR
FOR A COSMETICS APPLICATOR,
APPLICATOR, IN PARTICULAR COSMETICS
APPLICATOR COMPRISING AN
APPLICATOR DEVICE, AND AN
APPLICATION UNIT, IN PARTICULAR
COSMETICS UNIT, COMPRISING THE
APPLICATOR DEVICE

FIELD OF THE INVENTION

The invention relates to an applicator device, an applicator comprising the applicator device and an application unit comprising the applicator device.

BACKGROUND OF THE INVENTION

An applicator is known from WO 97/28719. Such an applicator comprises a carrier from which the application elements extend. These application elements have a curved profile, with the curvature increasing towards the free end of the application elements, i.e. the curvature radius associated therewith becomes smaller towards the free end of the application elements. Central longitudinal axes of the application elements according to WO 97/28719 consistently lie in a plane perpendicular to a longitudinal extent of the carrier of the application elements. Relative to the carrier, application elements are disposed like prongs, in a comb-like manner. Such an applicator, if used as a mascara applicator, is suitable for separating eyelashes due to its comb-like configuration. Due to the small number of application elements, however, a satisfactory application result of mascara mass on the eyelashes of the user probably cannot be expected because such a mascara applicator is unable to store enough mascara mass that is available for application on the eyelashes after the applicator has been pulled out of the mascara container.

In view of this, it is the object of the invention, on the one hand, to propose a plurality of possible applicator devices that have a high storage capacity for medium, in particular for mascara mass. It is another object of the invention to propose a plurality of possible applicator devices, in particular of mascara applicator devices that have a striking visual design and are thus clearly and spectacularly distinct from the visual appearance of known applicator devices. Furthermore, it is the object of the invention to propose such mascara applicators that additionally offer the option of enabling a particularly complete all-round wetting behavior with mascara mass of eyelashes of the user. Particularly, the mascara applicators are to be configured so as to be producible using a primary forming process, e.g. a plastic injection molding process.

SUMMARY OF THE INVENTION

An applicator device according to the invention comprises a carrier for an application element covering consisting of a plurality of application elements, wherein at least one application element comprises, along a longitudinal extent of the application element, at least one first section closer to the carrier and at least one second section more distant from the carrier, wherein at least one section of the application element has a curved central longitudinal axis. Such an applicator device is developed further in such a way that the central longitudinal axes of the first and second sections of the application element, in a transitional zone from the first to the second section of the application element, converge in at least one projection onto a sectional plane E through the application element so as to form a bend.

In this case, the sectional plane E through the application element is preferably disposed parallel to a longitudinal axis of the carrier or includes it.

Providing a bend along the longitudinal extent of application elements offers a plurality of visually spectacular design options for the application elements, so that the entire applicator device is visually striking, in particular if presented to a user clearly visible in the form, for example, of a blister pack. According to the invention, an application element of an applicator device according to the invention is divided into different and distinguishable sections along its longitudinal extent, with the sections respectively adjoining each other in transitional zones Ü and transitioning into one another. Within the transitional zones Ü, central longitudinal axes M1, M2 of the sections of the application elements respectively form a bend K relative to one another.

A bend K in the sense of the invention differs from a mere undulation or curve as it is already known for application elements, for example for undulated bristles, by the fact that the central longitudinal axes M1, M2, or the end tangents thereof on the transitional zones of adjoining sections of the application elements, include an angle α and thus converge in an acute manner or up to a certain maximum value. Moreover, a rounded convergence of two such central longitudinal axes M1, M2 or of end tangents $T_{Ü10}$, $T_{Ü20}$ is also considered a bend within the sense of the invention, with a maximum rounded-portion radius R being possible in this case which is less or equal to a diameter D of the application element within the transitional zone Ü in which the bend is located or formed. In the case of an acute convergence of two such central longitudinal axes M1, M2 of sections of the application elements, the transitional zone Ü is a common point of the central longitudinal axes in which they converge. In the case of a transition between the central longitudinal axes rounded as described above, the rounded portion with the rounding radius $0 < r \leq d$ is to be understood as a transitional zone between the sections of the application elements.

The sectional plane E, which, as was already described, either includes the longitudinal axis of the carrier or is disposed parallel thereto, is preferably a separating plane of a molding tool, for example of an injection molding tool. The application elements according to the invention have a bend in at least one projection into this sectional plane E.

Though the measure for the diameter "D" is more closely defined in the above description, the cross section of the application elements is of course not limited to only a cylindrical cross section with a diameter dimension in the literal sense. Rather, other cross-sectional profiles of the application elements may also be realized. In such a case, the longest distance in a cross section perpendicular to the central longitudinal axis of the application element that results from the penetrating point of the central longitudinal axis through the sectional plane to the point of the outer face of the application element from the penetrating point that has the furthest possible distance from the penetrating point is always considered the diameter D.

For example, given a cross section of the application element which, in a sectional plane perpendicular to the central longitudinal axis of the application element, has the shape of an equilateral triangle, the maximum admissible measure for a rounded-portion radius R is the distance from the penetrating point of the central longitudinal axis through the sectional plane to the tip of an equilateral triangle. The same applies, mutatis mutandis, in the case of an oval or otherwise polygonal cross section of the application elements, for example. The maximum admissible radius of curvature R in this case always results from the maximum distance between the central longitudinal axis of the respective section and the furthest point of the outline of the application element in the sectional plane.

Such a configuration of the application elements provided with a bend opens up a plurality of options for configuring the application elements, which leads to a plurality of new and visually more striking configurations of the entire applicator device and/or the entire applicator.

For example, it is possible to configure the central longitudinal axis of the other section of the application element to be straight or also curved.

Special visual effects can be obtained if the first section (which is closer to the carrier) has a curved central longitudinal axis and the second section (more distant from the carrier) has a straight central longitudinal axis.

Different visual impressions can be achieved if the first section of the application element has a straight central longitudinal axis and the second section has a curved central longitudinal axis that converge in the transitional zone Ü at an angle α.

Another alternative configuration is that both sections have a curved central longitudinal axis M1, M2 whose end tangents $T_{Ü10}$, $T_{Ü20}$ converge in the transitional zone Ü at the angle α.

Values between 30° and 170°, in particular between 45° and 120°, particularly preferably values between 60° and 90° have proved positive for the angle α.

As was already mentioned, the bend K may have a rounded-portion radius R, with the rounded-portion radius R being in the range of 0≤r≤D, preferably 0<r≤0.5 D, particularly preferably 0<r≤0.4D and D being a diameter of the application element 3 in the transitional zone Ü. This size of the maximum rounded-portion radius R of the bend K ensures that an outer surface of the application element visually has a bend.

Preferred embodiments result if the central longitudinal axis of the second section in the area of a free end of the application element includes an angle γ with the longitudinal axis L of the applicator device, with the following being applicable for the value of the angle: 0≤γ≤90°, in particular 15°≤γ≤75°, particularly preferably 30°≤γ≤60°.

The first section of the application element closer to the carrier has a height h1 and the entire application element has a height h, with the ration h1:h preferably being in the range of from 0.1 to 0.9, in particular in the range between 0.4 and 0.8, particularly preferably in the range between 0.3 to 0.6. It is thus ensured that the individual sections (first section and second section) are clearly distinguishable from one another when looking at such an embodiment of the applicator device according to the invention.

In order to achieve other visually attractive embodiments of the applicator device according to the invention, it may be expedient to configure the curvatures of the central longitudinal axes of the first and second sections similarly. This means that the curvatures may have the same sign and are equal in value, or have the same sign and are different in value.

Nevertheless, it is also possible to configure the curvatures of the central longitudinal axes of the first and second sections 10, 20 in opposite directions, i.e. that the curvatures of the two sections have different signs and optionally the same value, or curvatures that have different values. With regard to the graphic representation in the Figures, this means that— viewed in a sectional plane E—the center(s) of curvature of the one section come to lie on the one side of the application element, and the center KR of curvature or centers of curvature of the other section come to lie on another side of the application element.

According to a particular embodiment, the central longitudinal axis of the first section or a tangent $T_F$, at the base point of the central longitudinal axis M1 of the first section, includes an angle β with a longitudinal axis L of the applicator device, with the angle β being in the range of from 30° to 90°, particularly preferably in the range of from 45° to 60°. This measure makes it possible to both design application elements that visually protrude perpendicularly from the carrier, as well as application elements disposed visually at an oblique angle to the carrier. In this case, the application elements may of course both be disposed inclined towards a free (distal) end of the applicator device as well as inclined towards a handling means, such as a handle section of the applicator device.

In a particular embodiment of the invention, the first section of the application elements is formed from a first plastic material, in particular from the plastic material of the carrier, whereas the second section is made from a second plastic material different from the first plastic material.

In a particular embodiment the second plastic material is configured softer as compared to the first plastic material.

Expediently, the applicator device according to the invention is configured so as to be easily producible by means of a primary forming process, with the primary forming processes defined in DIN 8580 being, in principle, possibilities therefor, but with particular emphasis in this case being put on the plastic injection molding process as well as on 3-D printing processes.

In a particular configuration of the invention, the application elements are disposed along a longitudinal axis L in rows R1, R2, R3, ..., $R_n$, with adjacent application elements of a row R1, R2, R3, ..., $R_n$ having a distance d from one another. The smallest distance of application elements of adjacent rows R1, R2, R3, ..., $R_n$, viewed in the longitudinal direction L, is in this case preferably d'≤0.5d of the applicator device. Thus, if d'=0.5d, the application elements of the one row R1, viewed in the longitudinal direction, are respectively disposed centrally between corresponding application elements of adjacent rows. If d'<0.5d, mutually closest application elements of adjacent rows exist, wherein these application elements respectively form application element pairs A1 and the application elements of the application element pair A1, in a side view perpendicular onto the longitudinal axis L, may contact each other at least partially, may overlap, or may have a small distance a between them, wherein 0 mm<a≤0.8 mm, in particular 0 mm<a≤0.3 mm.

Preferably, application elements of adjacent rows $R_1$, $R_2$, $R_3$, ..., $R_n$ are disposed in opposite directions with regard to the direction in which the free ends of the application elements point with regard to the applicator device. A clamp which is particularly suitable for gripping eyelashes and thus ensures a good all-round wetting of eyelashes and forming of the eyelashes is thereby provided.

In a particular embodiment of the invention, the central longitudinal axes M1, M2 of the first and second sections lie in a plane E' or span this plane. According to the particular embodiments, the plane E' is disposed parallel or inclined at an angle δ to the longitudinal axis L of the applicator device, wherein, according to current knowledge, angles between 0°≤δ<10° can still be produced well in plastic injection molding processes. Central longitudinal axes of the different application elements can in this case each span different planes E' or lie in this respective plane E'.

Provided that the central longitudinal axes of the sections lie in the plane E' and the plane E' has an angular offset to the longitudinal axis L of the applicator device, a projection into the sectional plane E that is oriented parallel to the longitudinal axis L or contains it is the sectional playing E in which the bend K of an application element according to the invention must be measurable or provided.

According to another embodiment, all central longitudinal axes of all application elements of a single row R1, R2, R3, . . . , $R_n$ lie in the plane E' or in the sectional plane E.

Further advantageous embodiments are specified in the further dependent claims. For example the application elements may taper towards their free end. The height h of the application elements may decrease towards the distal end of the applicator device. The ratio h1:h may be constant for all application elements of an applicator device or decrease towards the distal end.

Moreover, the ratio h1:h may vary over the longitudinal extent of the applicator device along the longitudinal axis L, so that one or more application elements with a first ratio h1:h and one or more application elements with one or more other ratios h1:h deviating therefrom are provided.

In order to achieve certain visual effects, or also to achieve certain characteristic properties with regard to the storage capacity of mascara or of the application behavior of mascara onto eyelashes, applicators according to the invention may have further application elements of a different type, which are configured, for example, as conical or cylindrical bristles and/or discs and/or furrows and/or disk segments and/or tooth segments and/or teeth and/or prongs or the like. Such application elements can be disposed distributed over sections over the applicator device. This means that, for example, one area with the application elements bent according to the invention and other areas of the application element covering with other application elements are provided.

It is, however, also possible that bent application elements are disposed so as to alternate regularly or irregularly between or next to other application element types.

The invention moreover relates to an applicator, in particular a cosmetics applicator, comprising the applicator device according to the invention. Moreover, the invention also extends to an application unit, in particular a cosmetics unit, which comprises the applicator device according to the invention.

The invention is explained in more detail below by way of example with reference to the Figures.

BRIEF DESCRIPTION OF THE DRAWINGS

FIG. 2 shows a first embodiment of a bent application element for an applicator device according to the invention in an enlarged longitudinal sectional view along the longitudinal axis L according to FIG. 1 of an application element (sectional plane E).

FIG. 2a shows a detailed view of the detail X from FIG. 2.

FIG. 4 shows another embodiment of a bent application element for an applicator device according to the invention.

FIG. 5 shows another embodiment of a bent application element for an applicator device according to the invention.

FIG. 6 shows another embodiment of a bent application element for an applicator device according to the invention.

FIG. 7 shows another embodiment of a bent application element for an applicator device according to the invention.

FIG. 8 shows another embodiment of a bent application element for an applicator device according to the invention.

DETAILED DESCRIPTION OF THE PREFERRED EMBODIMENTS

Figure 1:
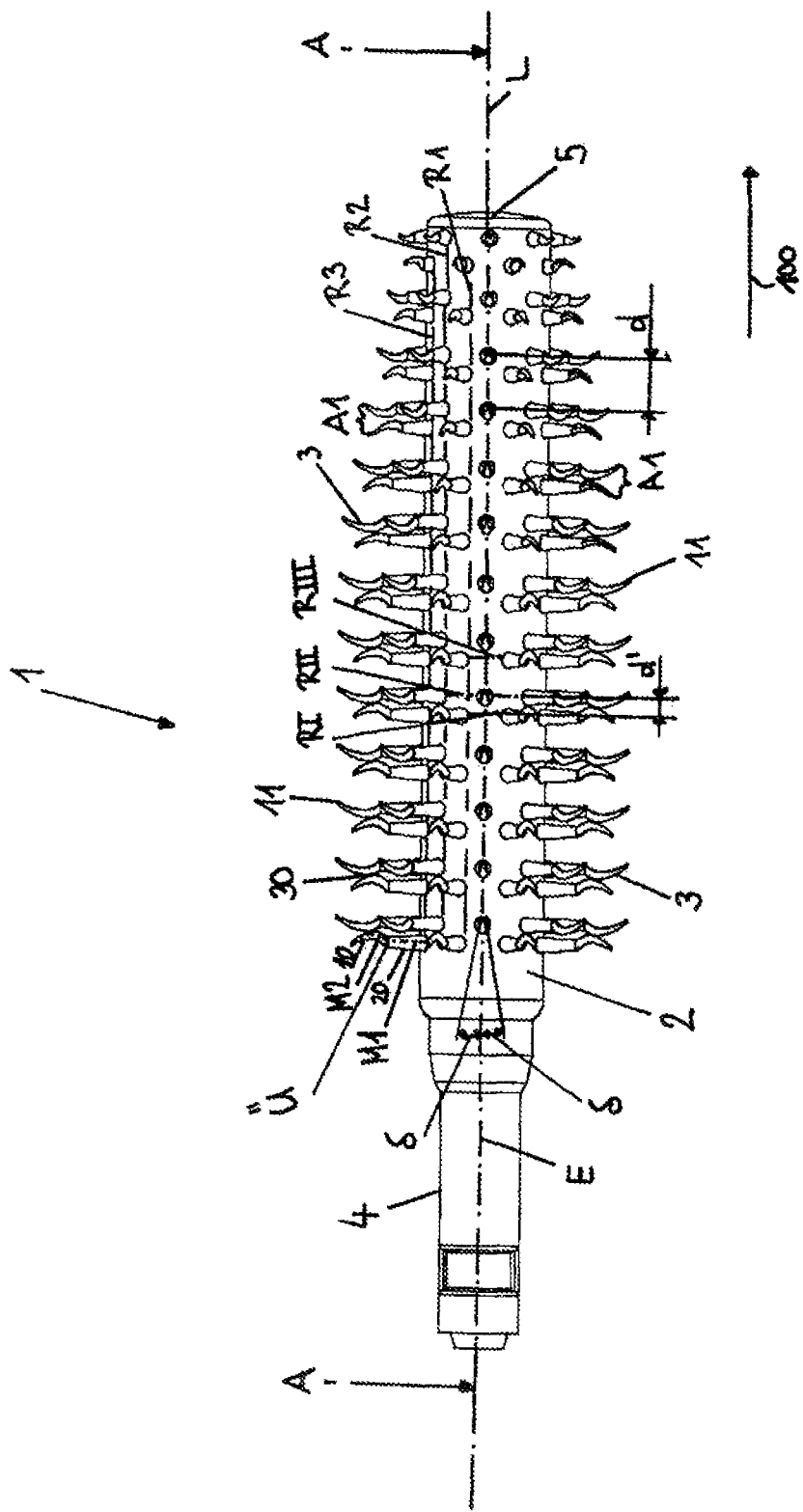
FIG. 1 shows a side view onto an applicator device according to the invention.

FIG. 1 shows an applicator device 1 according to the invention with a carrier 2. The carrier 2 has an application element covering with a plurality of application elements 3. Moreover, the carrier 2 has a proximal end 4 and a distal end 5. The proximal end 4 faces a user's hand and, for example, serves for the attachment of an applicator stem (not shown) or of an applicator handle section (not shown) for the applicator device 1.

The distal end 5 is a free end. The applicator device 1 and the carrier 2 have a longitudinal axis L along a longitudinal direction 100. The application elements 3 are disposed in rows R1, R2, R3, . . . , $R_n$ along the longitudinal direction 100. The rows R1, R2, R3, . . . , $R_n$ extend parallel to the longitudinal axis L.

Individual application elements 3 of a row R1, R2, R3, . . . , $R_n$ have the distance d from one another. In a circumferential direction U, the application elements are disposed in rows (RI, RII, RII . . . , $R_n$). Adjacent application elements 3 of rows RI, RII, RIII, . . . , $R_n$ or of rows R1, R2, R3, . . . , $R_n$, viewed in the longitudinal direction 100, have a distance d', with the distance d' preferably being smaller than half the distance d. In this case, respectively adjacent application elements 3 of two adjacent rows R1, R2, R3, . . . , $R_n$ or of rows RI, RII, RII, . . . , $R_n$ form an application element pair A1, with application elements 3 of the application element pairs A1 respectively having a smaller distance relative to one another in comparison to other application elements 3.

The application elements 3 have a first section 10, which, compared with a second section 20, is closer to the carrier 2.

The first section 10 has a central longitudinal axis M1. The second section 20 has a central longitudinal axis M2. At least one of the central longitudinal axes M2 and/or M1 has a curved profile. In the exemplary embodiment according to FIG. 1, the first section 10 has a straight profile of the associated central longitudinal axis M1, whereas the second section 20 with its central longitudinal axis M2 has a curved profile.

In the exemplary embodiment according to FIG. 1, the central longitudinal axes M1 and M2 converge in a transitional zone Ü and there form a bend K (in this regard, also see the description below and FIGS. 2, 2a).

In the exemplary embodiment according to FIG. 1, two respectively curved sections 20 of two application elements 3 of an application element pair A1 are oriented so as to point towards each other with their convexly curved outer faces, so that one application element pair A1 respectively forms a kind of capturing funnel 30 in which, for example, eyelashes of a user that are to be wetted with mascara mass can be captured and particularly effectively wetted all around with mascara mass.

The application elements 3 are disposed within one of the rows R1, R2, R3, . . . , $R_n$, respectively, in such a way that free ends 11 of the application elements 3 of one of the rows point in the same direction in the longitudinal direction 100 or in a direction contrary to the longitudinal direction 100. Of course, it is also possible to dispose the application elements 3 in a row R1 or R2 or R3 alternatingly or taking turns in other ways along the longitudinal direction 100.

The applicator device 1 is preferably produced by means of a primary forming process in accordance with DIN 8580. Plastic injection molding processes or 3D printing methods are particularly suitable therefor, wherein the applicator device 1 can be produced both from a single plastic material as well as from several different plastic materials, for example in a one- and/or two- and/or multi-component injection molding process.

Such a primary forming process in accordance with DIN 8580, in particular such a plastic injection molding process, can in this case be carried out in such a way that at first, a first plastic and then another plastic is injected into one and the same mold, so that predefined partial areas of the applicator device 1 are formed from the first, and other predefined partial areas of the applicator device 1 are formed from the second further plastic.

Furthermore, however, it is also possible to first produce a first part of the applicator device 1 in a first mold, and then to integrally mold onto the first part a second or further part of the applicator device 1 by injection. For example, the carrier 2 and the first sections 10, respectively, of the application elements 3 can be produced in a first injection-molding process and the second sections 20 of the application elements 3 can be injection-molded thereon in a second injection molding process.

What is important with regard to the production within the context of a primary forming process is that the applicator devices 1 are not assembled from differently prefabricated parts, as is the case, for example, in the brushes well known from the prior art comprising a twisted wire core and bristles inserted or clamped into it.

It is an object of the invention to propose applicator devices 1 that can be produced using a primary forming process and which take into account in a realizable extent the boundary conditions of such primary forming process, for example production engineering limits of plastic injection molding.

A possible geometrical three-dimensional shape of the application elements 3 will be explained below with reference to FIG. 2, using a selected exemplary embodiment.

A sectional plane E is selected for this purpose which shows a section along the line A-A from FIG. 1. In this case, the sectional representation is of the application elements 3, which in FIG. 1 are shown as members of the row R2. The sectional plane E (plane of drawing of FIG. 2) in the embodiment shown is also a central plane E' of the sectioned application elements 3. The central plane E' of the application elements 3, however, may also be inclined relative to the sectional plane by an angle $\delta=+/-10°$ (see FIG. 1). With regard to the further information, however, the projection into the sectional plane E according to FIG. 2 (=its plane of drawing) is what is important below. A possible arrangement of the central plane E' through the individual application elements 3 inclined by an angle $\delta=$up to $+/-10°$ relative to the sectional plane currently appears feasible with regard to injection molding, in particular with regard to the molds required therefor.

The first section 10 of the application element 3 projects away from the carrier 2. The central longitudinal axis M1 of the first section 10 has a straight profile and includes, in the exemplary embodiment according to FIG. 2, an angle $\alpha$ of 90° with the longitudinal axis L of the applicator device 1. The central longitudinal axis M1 meets the carrier 2 in a base point 15 of the application element 3. The first section 10 projects over a height h1 from an outer face 12 of the carrier 2.

A second section 20 of the application element 3 which comprises a curved central longitudinal axis M2 is provided radially adjacent to the first section 10.

The second section 20 has a radial extent h2. At the free end 11 of the application element 3, the central longitudinal axis M2 has a tangent $T_F$ which includes an angle $\gamma$ with the longitudinal axis L. On the other end, the central longitudinal axis M2 has a tangent $T_{20Ü}$, which belongs to the transitional zone Ü and which, in the exemplary embodiment according to FIG. 2, includes with the central longitudinal axis M1 an angle $\beta$ and intersects the central longitudinal axis M1 acutely in a point P. This acute intersection of the tangent $T_{20Ü}$ and the central longitudinal axis M1 is to be considered, among other things, a bend within the sense of the invention.

In the depicted exemplary embodiment according to FIG. 2, the central longitudinal axes M1 and M2 thus converge in a point and in this point form the bend K.

However, not only an absolutely acute convergence of the two central longitudinal axes M1 and M2 that is based on theoretical geometrical considerations is to be considered a bend K within the sense of the invention. In order to achieve the visually appealing and spectacular effects, the transition between the central longitudinal axes M1 and M2 may also have a smaller transition radius without losing the visual effect of a bend. In this context, reference is made to the following description in connection with FIG. 2a.

The tangent $T_{20Ü}$ as well as the central longitudinal axis M1 and the central longitudinal axis M2 is depicted therein. In the transitional zone Ü, which in the theoretical example according to FIG. 2 has the radial extent 0, the central longitudinal axis M1 and the central longitudinal axis M1 are connected in a rounded manner by means of a rounded-portion radius R. In order for such a transition of the central longitudinal axes M1 and M2 to still be visually perceived as a bend in the profile of the application element 3, the rounded-portion radius R between the merging central longitudinal axes M1 and M2 is selected to be no larger, if possible, than a diameter D of the application element 3, with the diameter D indicating a diameter of the application element 3 in the transitional zone Ü. In this case, the diameter D may indeed be the largest diameter provided in the transitional zone of the application elements 3. Up to a measure of R≤1.0D, the transition of the first section 10 into the second section 20 of the application element 3 visually appears as a bend within the sense of the invention. If the rounded-portion radius R≥1.0D is chosen, then the visual impression of the application element 3 in the transitional zone Ü corresponds more to an undulated or gently curved profile of the application element 3, which is not what is to be achieved according to the invention. For illustration purposes, two further diameters D1 and D2 are depicted in FIG. 2a, which all lie in the transitional zone Ü (definition) and can thus be used as a suitable basis for determining the maximum radius of curvature R≤1.0D or 1.0D1 or 1.0D2. In this case, the diameters D, D1 and D2 are to be respectively determined perpendicular to the central longitudinal axis M1 and/or M2, depending on their position. In practice, such a determination of the rounded-portion radius R, depending on the design of the geometrical three-dimensional shape of the application elements 3 as they typically occur in mascara applicators, yields maximum possible rounded-portion radii in the range of between 0.2 mm to 0.8 mm, given application element diameters in the transitional zone in the range of from 0.2 mm to 0.8 mm. It does not follow from the term "diameter" that this must inevitably relate to cylindrical application elements 3. "Diameter" in the present sense is the maximum distance of a penetrating point of the central longitudinal axes M1, M2 of the sectional plane E from the furthest outline point of the section through the application element.

In a variation of the illustration according to FIG. 2a, the angle $\beta$, in the case that the first section 10 also has a curved central longitudinal axis M1, just like the second section 20 in the exemplary embodiment, is to be understood as an angle between the respective end tangents $T_{10\ddot{U}}$, $T_{20\ddot{U}}$ of the central longitudinal axes M1, M2 that directly converge in the transitional zone Ü or are connected in a rounded manner via a radius R. Thus, the central longitudinal axis M1 of the first section 10 coincides with the tangent $T_{10\ddot{U}}$ of the first section 10 in the exemplary embodiment according to FIG. 2a.

Another exemplary embodiment of the applicator device 1 according to the invention with a special design of the application elements 3 will be explained below with reference to FIG. 3.

Figure 3:
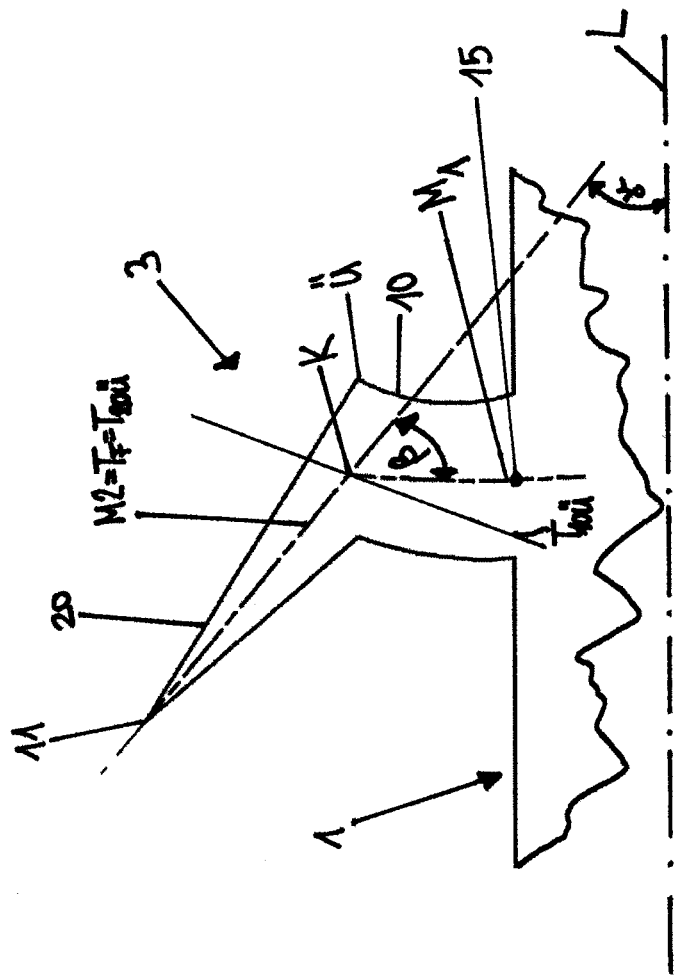
FIG. 3 shows another embodiment of a bent application element for an applicator device according to the invention.

In the embodiment of the application element 3 according to FIG. 3, in contrast to the above-described embodiments, the first section 10 (closer to the carrier) is provided with a curved central longitudinal axis M1, whereas the second section 20 (more distant from the carrier) of the application element 3 has a straight central longitudinal axis M2. The tangent $T_{10\ddot{U}}$ of the first section 10 includes the angle β with the central longitudinal axis M1. The central longitudinal axis M2 (straight central longitudinal axis) includes the angle γ with the longitudinal axis L of the applicator device 1. Because it is straight, the central longitudinal axis M2 of the embodiment shown coincides with the tangent $T_F$. The tangent $T_{10\ddot{U}}$, together with the central longitudinal axis $M2=T_F=T_{20\ddot{U}}$, forms the bend K in the transitional zone Ü.

In the embodiment according to FIG. 4, the basic structure corresponds to that of FIG. 3, with the angle γ being 90°, in contrast to the embodiment according to FIG. 3.

Another difference in the embodiment according to FIG. 4 is that the central longitudinal axis M1 of the first section 10 projects from the carrier 2 at an oblique angle to the longitudinal axis L in the base point 15, i.e. at a base point angle $\alpha_F<90°$.

In an embodiment according to FIG. 5, the first section 10 is configured with a straight central longitudinal axis M1 and the second section 20 with a curved central longitudinal axis M2. Viewed in the longitudinal direction 100, the first section 10 is in this case disposed inclined towards the free (distal) end 5 of the applicator device 1, with the second section 20 being disposed inclined in the opposite direction, so that the free end 11 of the application element 3 points in the direction contrary to the longitudinal direction 100, i.e. towards the proximal end 4.

In an embodiment according to FIG. 6, the two sections 10 and 20 each have a curved central longitudinal axis M1 and M2 which converge in the transitional zone Ü while forming the bend K.

Both central longitudinal axes M1 and M2 have in this case similar curvatures, i.e. curvatures having the same sign. The centers of curvature KR of these curvatures each lie on a common side of the application element 3.

In the illustration according to FIG. 6, these centers of curvature are schematically indicated by KR. Such an arrangement of similarly curved sections 10 and 20 results in a visually particularly striking shape of the application element 3.

In another of the applicator device 1 according to the invention embodiment according to FIG. 7, the two sections 10 and 20 each have a curved central longitudinal axis M1 and M2 which form the bend K in the transitional zone Ü.

In the embodiment according to FIG. 7, the free end 11 of the application element 3 points in the longitudinal direction 100 towards the distal end 5 of the applicator device 1. Of course, the arrangement of the application element 3 shown may also be mirrored, so that the free end 11 points towards the proximal end 4 of the applicator device 1.

Again, the tangents $T_{10\ddot{U}}$ and $T_{20\ddot{U}}$ include the angle β also in this case. The bend K in the transitional zone Ü is thus formed.

For further illustration, it is defined below what is to be understood by the central longitudinal axes M1 and M2 of the application elements 3 and how they are determined if required.

The central longitudinal axes M1 and M2 are each formed by centroids of the area of the sectional surfaces through the application elements 3, with the sectional surfaces of the sectional plane E moving along the entire radial extent h of the application elements 3.

The curvatures of the central longitudinal axes M1 and M2 are similar in the exemplary embodiment according to FIG. 7.

The embodiment according to FIG. 8 shows an example with contrary curvatures of the central longitudinal axes M1 and M2. The centers of curvature KR of the first section 10 and of the second section 20 (shown in a very schematic way) lie on different sides of the application element 3.

It can be seen from the plurality of the embodiments described in detail that a plurality of visually spectacular designs of application elements can be realized by means of the solution according to the invention, which additionally can be reproducibly and accurately produced in a particularly precise manner using a primary forming process.

Moreover, it is especially advantageous that mascara reservoirs or mascara reservoir volumes near the carrier 2 can be formed in a special manner due to the degree of curvature and direction of curvature of the application elements being largely freely selectable, in particular if two application elements 3 forming an application element pair A1 point towards one another with their concavely curved sides of the sections 10 closer to the carrier, so that in this case, the volume is enveloped in a certain sense, which is particularly suitable for retaining mascara on the applicator even after a wiping process has possibly taken place.

Due to a special design of, in particular, the sections 20 more distant from the carrier—as described above—by convexly curved areas of two application elements 3 forming an application element pair A1 which point towards each other, a capturing funnel 30, in particular, which clamps or captures eyelashes can be formed very effectively, which particularly can ensure an all-round wetting of the eyelashes preferred in some areas of use.

In particular if the applicator device 1 according to the invention is produced from different plastic materials, if the sections 20 are, for example, configured to be softer than the sections 10 or vice versa, further constructional degrees of freedom, in particular further positive user effects, can be obtained with the applicator device according to the invention which go beyond the spectacular visual appearance.

It should be noted for all embodiments that it is of course possible to combine application element designs according to the described and also according to other embodiments included in the invention with each other in any way, provided production engineering limits of the primary forming process to be preferably used are not exceeded.

Nevertheless, it is also possible to produce an applicator device 1 that also has application elements 3 of another type, for example discs, furrows or teeth, prongs or the like, which are used in combination with the bent application elements 3 according to the invention.

The distal end 5 of the carrier 2 may also indeed have an application element covering, which may either consist of bristles/application elements already known from the prior art, or of applications elements according to the invention, which have a bend.

The invention can of course also be applied correspondingly to applicator devices with a straight longitudinal axis L as well as to applicator device with an optionally curved or otherwise non-straight longitudinal axis L. If applicable, the specifications made with regard to the longitudinal axis L in that case apply mutatis mutandis section-by-section, or with regard to tangents on the longitudinal axis L, which in turn readily enable the person skilled in the art to transfer the specifications made also to curved longitudinal axes.

Moreover, there is of course the option, in addition to the two explicitly described sections 10 and 20, to provide further sections for application elements for whose transition the bends K described or the like may then optionally be provided or not. However, what is important according to the invention is that at least one bend K is provided in at least one application element 3.

All application elements described in connection with the embodiments taper towards the free ends 11. Of course, it is also within the scope of the invention to use cylindrical or other geometrically cord-like application elements that do not taper towards the free end 11 but may optionally even become thicker.

The invention claimed is:

1. An applicator device comprising:
    a carrier having an application element covering consisting essentially of a plurality of application elements, wherein, at least two application elements comprise, along their longitudinal extent, at least one first section closer to the carrier and at least one second section more distant from the carrier, wherein the first section, tapers from its proximal end to its distal end, and a longitudinal axis of the first section has a straight profile and includes an angle of about 90° with a central longitudinal axis of the applicator device and the second section has a central longitudinal axis curved steadily in one direction with an apex between its proximal end and its free distal end,
    wherein the central longitudinal axes or their end tangents of the first and second sections, in a transitional zone from the first to the second section, converge in at least one projection onto a sectional plane through the application elements so as to form a bend; and
    the plurality of application elements extend in a longitudinal direction in first rows extending parallel to the longitudinal axis, and are disposed in second rows in a circumferential direction, wherein respectively adjacent application elements of two adjacent first rows form application element pairs that respectively have a smaller distance from each other than to other application elements, and the at least two application elements form at least one of the application element pairs where the curved sections of the application element pairs are oriented so as to point towards each other with their convexly curved outer faces, so that the at least one application element pair respectively forms a capturing funnel in which eyelashes of a user can be captured that are to be wetted with mascara mass, wherein the capturing funnel is defined between the free distal ends and apexes of the second sections of the application element pair, with the free distal ends and apexes of the second sections of the application element pair, with the free distal ends having a greater spacing therebetwen and the capturing funnel tapering to a narrower spacing between the apexes, and the first sections of the application element pair that, viewed in a radially inward direction, are situated underneath the capturing funnel are spaced from each other and delimit between them a free intermediate space, wherein the free intermediate space is defined between the apexes of the second sections and the proximal ends of the first sections of the application element pair, with the proximal ends of the second sections having a greater spacing therebetween than the spacing between the apexes, and the distal ends of the first sections coinciding with the proximal ends of the second sections and having a greater spacing therebetween than the spacing between the proximal ends of the first sections.

2. The applicator device according to claim 1, wherein the first section has a straight central longitudinal axis and the second section has a curved central longituidinal axis, said axes, or the end tangents thereof on the side of the transitional zones, converging in the transitional zone at an angle ($\alpha$).

3. The applicator device according to claim 2, wherein the angle ($\alpha$) is in a range of between 30° and 170°.

4. The applicator device according to claim 1, wherein the bend has a maximum rounded-portion radius (R), with the maximum rounded-portion radius (R) being greater than 0 and less than a diameter (D) of the application element in the transitional zone.

5. The applicator device according to claim 1, wherein the central longitudinal axis of the second section, in an area of a free end of the application element, includes an angle ($\gamma$) with a longitudinal axis of the applicator device, where the angle ($\gamma$) is greater than or equal to 0° and less than or equal to 90°.

6. The applicator device according to claim 1, wherein the first section has a height (h1) and the entire application element has a height (h), wherein the first section of the application element protrudes from the carrier of the applicator device by the extent (h1), or wherein the application element protrudes from the carrier of the applicator device as a whole by the extent (h).

7. The applicator device according to claim 6, wherein the ratio of the height (h1) of the first section to the height (h) of the entire application element (h1:h) is in a range of 0.1 to 0.9.

8. The applicator device according to claim 6, wherein the ratio of the height (h1) of the first section to the height (h) of the entire application element (h1:h) is constant for all application elements of an applicator device.

9. The applicator device according to claim 6, wherein the ratio of the height (h1) of the first section to the height (h) of the entire application element (h1:h) decreases towards a distal end of the applicator device.

10. The applicator device according to claim 1, wherein the central axis of the first section or a tangent at a base point of the central axis of the first section has an angle ($\beta$) to a longitudinal axis of the applicator device or to an outer face of the carrier.

11. The applicator device according to claim 10, wherein the angle ($\beta$) is in a range of between 30° and 90°.

12. The applicator device according to claim 1, wherein the first section is formed from a first plastic material of the carrier, and the second section is made from a second plastic material that is a softer plastic material compared with the first plastic material.

13. The applicator device according to claim 1, wherein the first rows of application elements are disposed along the longitudinal axis in rows (R1, R2, R3, . . . Rn), and adjacent application elements of a row (R1, R2, R3, . . . Rn), have a distance (d) from one another.

14. The applicator device according to claim 13, wherein the application elements of adjacent first rows (R1, R2, R3, . . . Rn) are offset from one another by a value less than or equal to half the distance (d) between adjacent application elements.

15. The applicator device according to claim 13, wherein mutually closest application elements of adjacent rows (R1, R2, R3, ... Rn) form the application element pairs (A1) which are parallel in a side view perpendicular to the longitudinal axis, where the application elements of the application element pairs contact each other at least partially, overlap, or have a small distance (a) between them, wherein the distance (a) is greater than 0 mm and less than 0.8 mm.

16. The applicator device according to claim 13, wherein application elements of adjacent rows (R1, R2, R3, ... Rn) are disposed in opposite directions with regard to the direction in which the free ends of the application elements point with regard to the applicator device.

17. The applicator device according to claim 1, wherein the central axes of the first and second sections lie in a single plane or span a plane.

18. The applicator device according to claim 17, wherein the plane is disposed parallel or inclined by an angle (δ) to the longitudinal axis, with the angle (δ) being greater than 0° and less than 10°.

19. The applicator device according to claim 17, wherein central axes of all application elements of a row (R1, R2, Rn) lie in the plane.

20. The applicator device according to claim 1, wherein the application elements are configured so as to taper towards free ends of the application elements.

21. The applicator device according to claim 1, wherein a height of the application elements decreases towards a distal end of the applicator device.

22. The applicator device according to claim 1, wherein the ratio of the height (h1) of the first section to the height (h) of the entire application element (h1:h) varies over the longitudinal extent of the applicator device along the longitudinal axis, so that application elements with a first ratio (h1:h) and application elements with one or more other ratios (h1:h) deviating therefrom are provided.

23. The applicator device according to claim 1, wherein the applicator device further comprises additional application elements, which are selected from the group consisting of conical bristles, cylindrical bristles, discs, furrows, disk segments, tooth segments, teeth, prongs, and combinations thereof.

24. The applicator device according to claim 1, wherein the applicator device is produced using a one or multi-component injection molding process or a 3D printing process.

25. The applicator device according to claim 1, wherein the applicator is a a cosmetics applicator, comprising at least one applicator device and a handle section connected to the carrier for handling the at least one applicator device.

26. An applicator unit for cosmetics, comprising a container for a cosmetic product, a wiper in the container and an applicator for accommodating and applying the cosmetic, wherein the applicator is the applicator device according to claim 1.

* * * * *